(12) United States Patent
Paxton et al.

(10) Patent No.: US 8,803,037 B2
(45) Date of Patent: Aug. 12, 2014

(54) CARBON POLYMER PAINT STEERING WHEEL HEATING SYSTEM

(75) Inventors: Donald James Paxton, Romeo, MI (US); Richard Lawrence Matsu, Plymouth, MI (US); David Robert Palm, Jr., Davisburg, MI (US)

(73) Assignee: Autoliv ASP, Inc., Ogden, UT (US)

( * ) Notice: Subject to any disclaimer, the term of this patent is extended or adjusted under 35 U.S.C. 154(b) by 298 days.

(21) Appl. No.: 13/153,969

(22) Filed: Jun. 6, 2011

(65) Prior Publication Data

US 2012/0305540 A1   Dec. 6, 2012

(51) Int. Cl.
B60L 1/00   (2006.01)

(52) U.S. Cl.
USPC ............................................ 219/204; 219/202

(58) Field of Classification Search
CPC .................................. B62D 1/065; C09D 5/24
USPC .......... 219/204, 543, 202, 544; 74/551.9, 552, 74/558
See application file for complete search history.

(56) References Cited

U.S. PATENT DOCUMENTS

| | | | |
|---|---|---|---|
| 5,098,771 A | * | 3/1992 | Friend ............................ 428/209 |
| 5,847,360 A | * | 12/1998 | Lorenzen et al. ............... 219/204 |
| 6,392,195 B1 | * | 5/2002 | Zhao et al. ...................... 219/204 |
| 6,441,344 B1 | | 8/2002 | Bonn et al. |
| 6,815,642 B2 | | 11/2004 | Haag et al. |
| 2004/0028859 A1 | * | 2/2004 | LeGrande et al. .......... 428/36.91 |
| 2004/0155020 A1 | * | 8/2004 | Worrell et al. ................. 219/204 |
| 2007/0210050 A1 | * | 9/2007 | Choi .............................. 219/204 |
| 2008/0210048 A1 | * | 9/2008 | Yoneyama et al. .............. 74/552 |
| 2010/0122980 A1 | | 5/2010 | Wang et al. |
| 2011/0073582 A1 | | 3/2011 | Morita et al. |

FOREIGN PATENT DOCUMENTS

KR   20100090621   8/2010

OTHER PUBLICATIONS

International Search Report and Written Opinion of the International Searching Authority regarding International Application No. PCT/US2012/041095, dated Jan. 29, 2013.

* cited by examiner

Primary Examiner — John Wasaff
(74) Attorney, Agent, or Firm — Harness, Dickey & Pierce, P.L.C.

(57) ABSTRACT

A steering wheel is provided and may include an armature having a rim and a coating at least partially surrounding the rim. A pair of electrodes may be respectively disposed within a pair of grooves formed in the coating. A polymer paint may be disposed on the coating and may include a plurality of carbon filaments that receive voltage from at least one of the pair of electrodes to selectively generate heat.

18 Claims, 3 Drawing Sheets

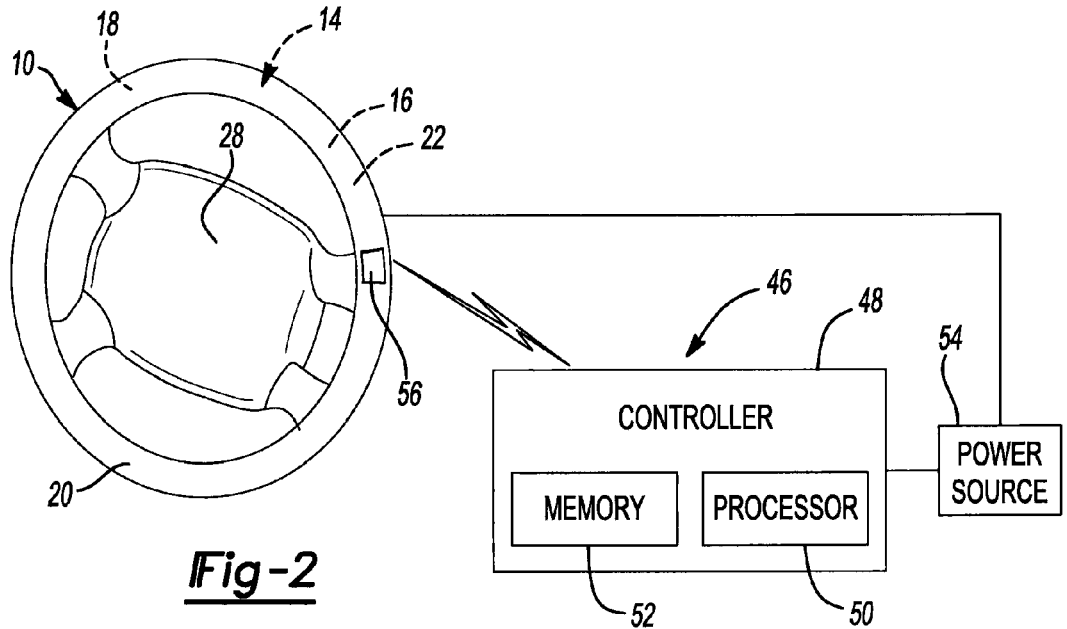
Fig-2
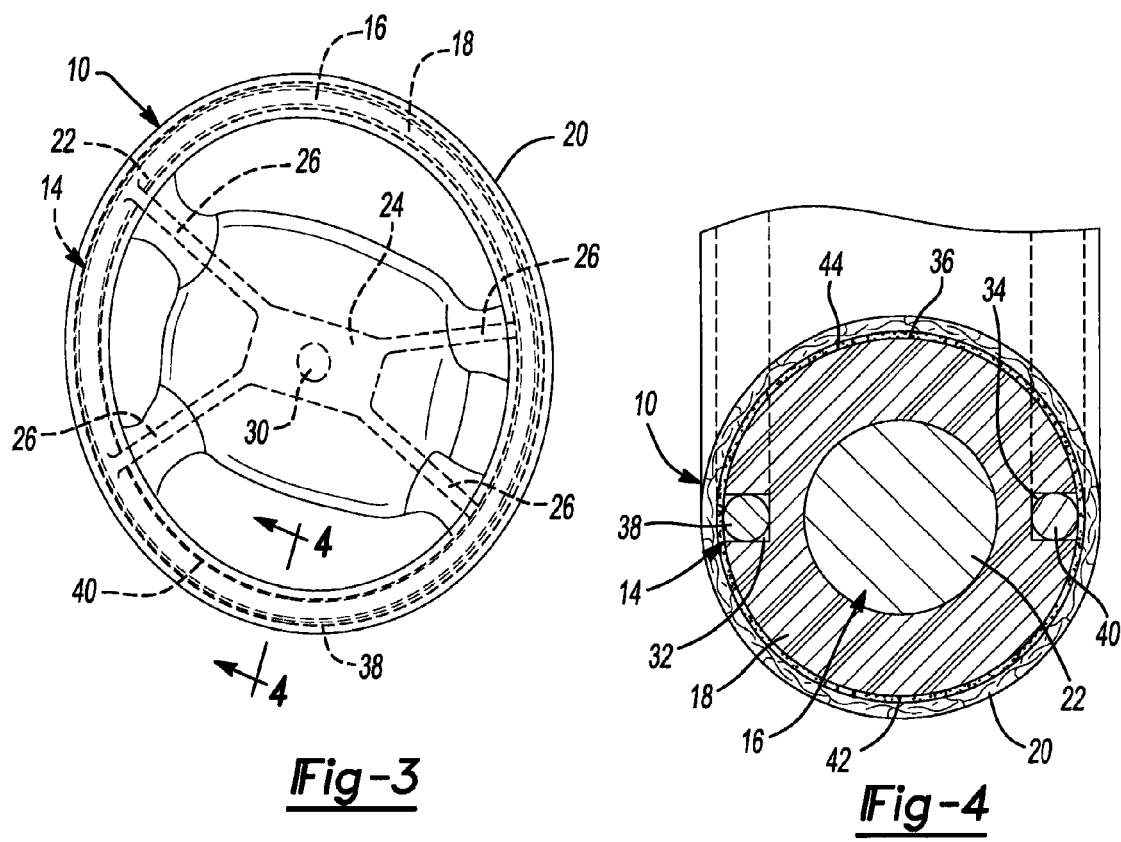
Fig-3
Fig-4

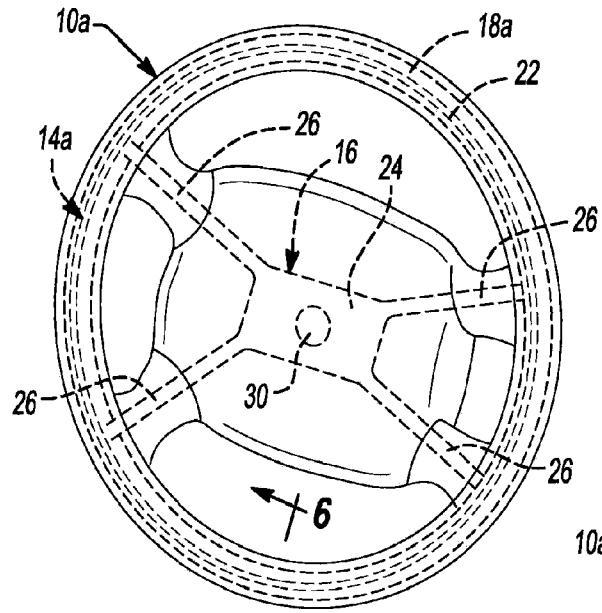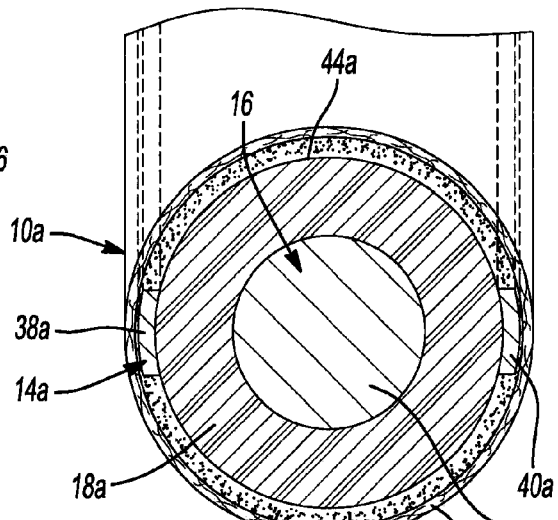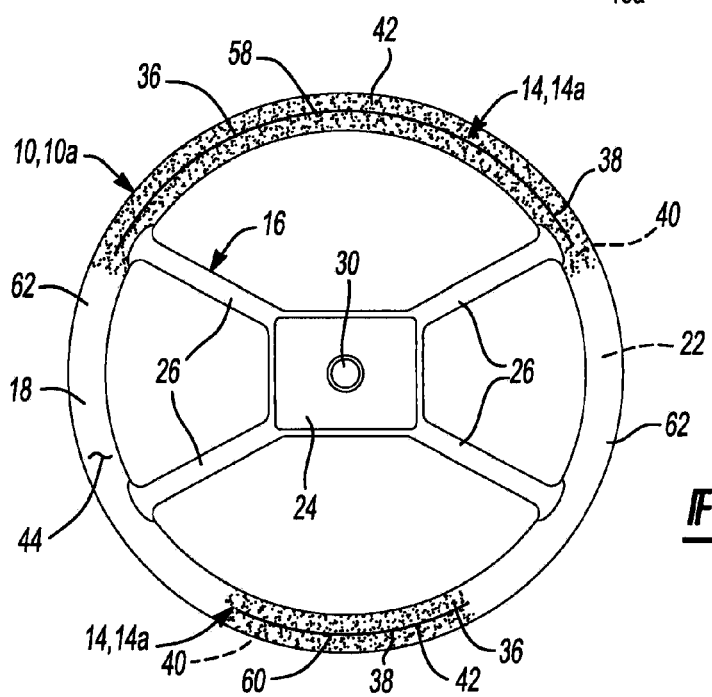

CARBON POLYMER PAINT STEERING WHEEL HEATING SYSTEM

FIELD

The present disclosure relates to steering wheels and more particularly to a heating system for a steering wheel.

BACKGROUND

This section provides background information related to the present disclosure which is not necessarily prior art.

Modern vehicles increasingly include features that add to the overall comfort and enjoyment of vehicle occupants. For example, modern vehicles typically include powered, heated, and/or cooled seats to facilitate operation of the seat and to provide a heating or cooling effect, thereby increasing the comfort of the vehicle occupants during both cold-weather conditions and hot-weather conditions. In addition, many vehicles include a heating, ventilation, and air conditioning system (HVAC) that provides front and rear occupants with individual controls to allow front and rear occupants to control the temperature at a particular location of the vehicle. Particularly for premium vehicles, the foregoing features are typically used in conjunction with one another to ensure each occupant is provided with an optimum and desired level of comfort when seated in the vehicle.

While any of the foregoing features may be implemented for a particular vehicle occupant and at any seating location within the vehicle, most features are at least directed to the comfort and enjoyment of the driver, as the driver likely spends the most time in the vehicle and typically makes the purchasing decision when buying another vehicle. Therefore, vehicle manufacturers pay particular attention to the features afforded to a driver both in comfort, aesthetics, and operation to provide the driver with an enjoyable and comfortable driving experience. To that end, vehicle manufacturers increasingly strive to optimize placement of vehicle controls and, further, to enhance the overall aesthetics and comfort of such controls.

When operating a vehicle, the driver is usually engaged with a steering wheel with one or both hands at all times. As a result, vehicle controls are usually incorporated into the steering wheel to facilitate operation of the vehicle. For example, modern steering wheels typically include switches or other control devices that operate various vehicle functions such as an audio system, a cruise-control system, and frequently a telephone system. Some steering wheels even incorporate paddles that allow the driver to shift a transmission of the vehicle in an effort to allow the driver to control virtually every function of the vehicle without having to remove either hand from the steering wheel.

Incorporation of the foregoing vehicle-control systems into the steering wheel increases the likelihood that a driver will maintain one or both hands on the steering wheel at all times. Aesthetic features and comfort features are increasingly added to steering wheels to increase the enjoyment and comfort of the driver when operating the vehicle. Such features typically include a leather wrap surrounding a rim of the steering wheel as well as various trim components extending from the leather-wrapped rim to a hub of the steering wheel. Such trim components may be formed from a wood-grain material, a metallic material, and/or a plastic material that cooperate to increase the feel and overall aesthetics of the steering wheel.

In addition to increasing the aesthetics and feel of the steering wheel, some steering wheels additionally include a heating system to provide the driver with a heating effect during cold-weather conditions. Such systems are typically incorporated into a rim of the steering wheel and generate the heating effect at the rim of the steering wheel, whereby the heating effect radiates through a leather wrap or other material surrounding the rim to allow the driver to experience the heating effect.

While conventional steering wheels may incorporate a heating system to provide a driver with an increased level of comfort, many such heating systems are bulky, complex, and costly. As a result, conventional steering-wheel heating systems increase the overall thickness of a steering-wheel rim, thereby increasing the amount of material required to construct the steering wheel and impacting the overall aesthetics and feel of the steering wheel.

SUMMARY

This section provides a general summary of the disclosure, and is not a comprehensive disclosure of its full scope or all of its features.

A steering wheel is provided and may include an armature having a rim and a coating at least partially surrounding the rim. A pair of electrodes may be respectively disposed within a pair of grooves formed in the coating. A polymer paint may be disposed on the coating and may include a plurality of carbon filaments that receive voltage from at least one of the pair of electrodes to selectively generate heat.

In another configuration, a heating system for a steering wheel having a rim is provided and may include a first electrode attached to the rim and a second electrode attached to the rim. A polymer paint may be applied to the rim and may be in electrical communication with the first electrode and the second electrode. The polymer paint may include a plurality of carbon filaments that receive voltage from at least one of the first electrode and the second electrode to selectively generate heat. A wrap may be disposed over the polymer paint to receive the heat from the carbon filaments.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 2 is a partial perspective view of a steering wheel and control system in accordance with the principles of the present disclosure, the steering wheel shown operatively associated with a control system and power source;

FIG. 3 is a partial perspective view of the steering wheel of FIG. 2;

FIG. 4 is a cross-sectional view taken along line 4-4 of FIG. 3;

FIG. 5 is a perspective view of a steering wheel in accordance with the principles of the present disclosure;

FIG. 6 is a cross-sectional view of the steering wheel of FIG. 5 taken along line 6-6 of FIG. 5; and FIG. 7 is a front view of a steering wheel in accordance with the principles of the present disclosure with part of an outer wrap removed to show internal components of a heating system in accordance with the principles of the present disclosure.

Corresponding reference numerals indicate corresponding parts throughout the several views of the drawings.

DETAILED DESCRIPTION

Figure 1:
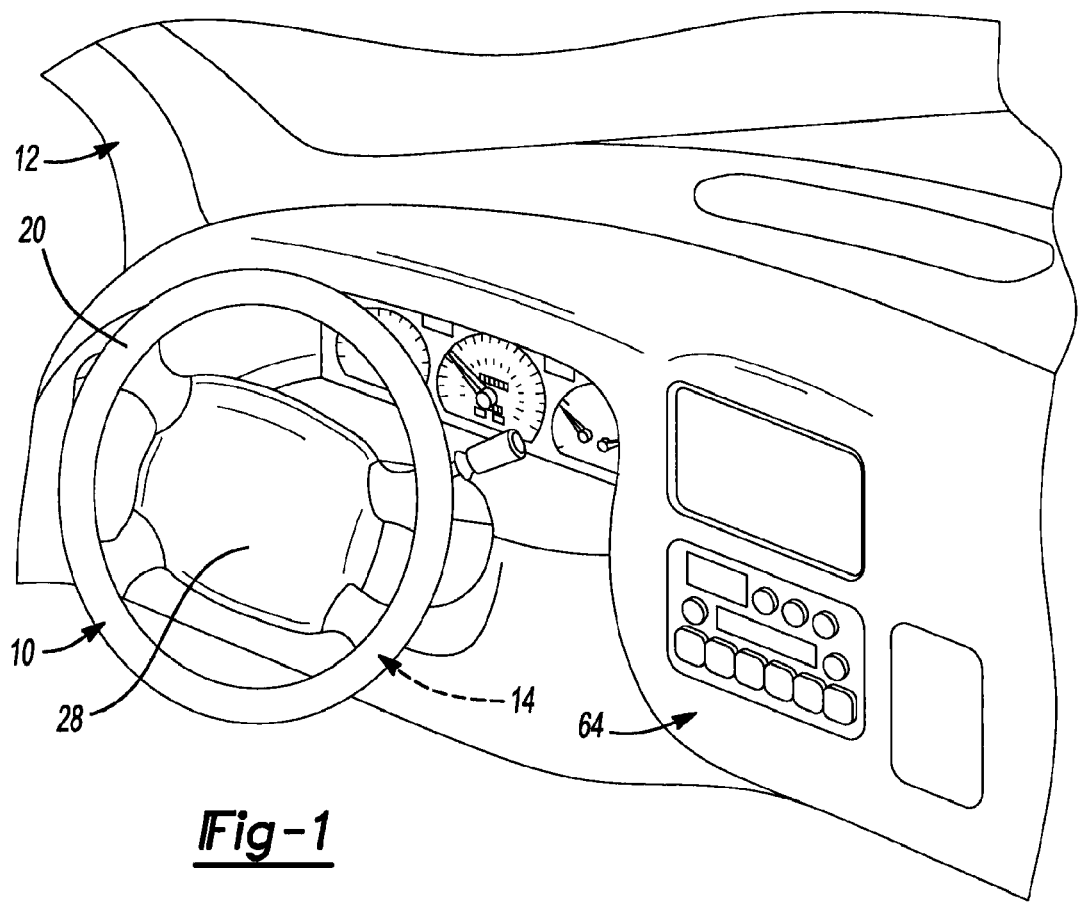
FIG. 1 is a partial perspective view of a vehicle incorporating a steering wheel in accordance with the principles of the present disclosure.

Example embodiments will now be described more fully with reference to the accompanying drawings.

With particular reference to FIGS. 1 and 2, a steering wheel 10 for use with a vehicle 12 is provided. The steering wheel 10 includes a heating system 14 that selectively supplies heat around a perimeter of the steering wheel 10 or, alternatively, supplies heat at discrete locations around a perimeter of the steering wheel 10 (FIG. 7) to raise a temperature of the steering wheel 10.

The steering wheel 10 may include an armature 16, a coating 18, and a wrap 20. The coating 18 may extend at least partially over a portion of the armature 16 while the wrap 20 may extend at least partially over the coating 18. The armature 16 may include a rim 22, a hub 24, and a series of spokes 26 extending generally between the rim 22 and the hub 24. The rim 22 may include a substantially circular shape and may be formed from a metal material such as, for example, aluminum. The hub 24 and spokes 26 may be integrally formed with the rim 22 and, therefore, may also be formed from aluminum. The hub 24 may be recessed from the rim 22 to provide a region for mounting an airbag assembly 28. Further, the hub 24 may include an aperture 30 to facilitate attachment of the steering wheel 10 to the vehicle 12.

The coating 18 may be formed from a plastic or rubber material and may fully surround the rim 22 about an entire perimeter thereof. The coating 18 may be injection-molded around the rim 22 and, as a result, may be bonded to the rim 22. Further, the coating 18 may be formed to include a first groove 32 and a second groove 34 that extend around an entire perimeter of the coating 18, as shown in FIG. 3. The first groove 32 and the second groove 34 may be formed at the same time the coating 18 is applied to the rim 22 and may be formed such that the first groove 32 is substantially diametrically opposed to the second groove 34. As a result, the first groove 32 and the second groove 34 may be located at opposite sides of the rim 22.

The wrap 20 may extend substantially around a perimeter of the coating 18 and may be formed from any suitable material such as, for example, leather, synthetic leather, and rubber. The wrap 20 may be attached to the steering wheel 10 via stitching or molding. Regardless of the particular construction of the wrap 20, the wrap 20 may surround the coating 18 such that the coating 18 and, thus, the rim 22 are not exposed.

With particular reference to FIGS. 2-4, the heating system 14 is shown to include a polymer paint 36, a first electrode 38, and a second electrode 40. The polymer paint 36 contains carbon filaments or carbon nanotubes 42 dispersed and arranged within the polymer paint 36 to permit voltage to flow through and be resisted by the carbon filaments or carbon nanotubes 42. The carbon filaments or carbon nanotubes 42 may be of the type described in U.S. Publication No. 2010/0122980, for example. The carbon filaments or carbon nanotubes 42 may be arranged in any configuration that permits current to flow between the first electrode 38 and the second electrode 40. While the polymer paint 36 may include carbon filaments or carbon nanotubes 42, the polymer paint 36 will be described hereinafter as including carbon filaments 42.

The polymer paint 36 may be applied to the coating 18 by spraying and/or brushing the paint 36 onto the coating 18. Regardless of the particular application of polymer paint 36 (i.e., either sprayed or brushed), the distribution and thickness of the polymer paint 36 on the coating 18 may be substantially uniform to provide a uniform coating of the polymer paint 36 on the coating 18. Namely, when the polymer paint 36 is applied to the coating 18 of the steering wheel 10, the thickness of the polymer paint 36 is substantially constant to provide the coating 18 and, thus, the steering wheel 10, with a uniform heating effect, as will be described in greater detail below.

The first electrode 38 may be received within the first groove 32 of the coating 18. Likewise, the second electrode 40 may be received within the second groove 34 of the coating 18. Once the first electrode 38 is received within the first groove 32 and the second electrode 40 is received within the second groove 34, the first electrode 38 is substantially diametrically opposed to the second electrode 40, as the first groove 32 is substantially diametrically opposed to the second groove 34, as described above. As such, the first electrode 38 is disposed on an opposite side of the rim 22 than the second electrode 40.

The first electrode 38 and second electrode 40 may be retained within the first groove 32 and second groove 34, respectively, via an adhesive and/or may be molded into the coating 18 when the coating 18 is molded onto the rim 22. Alternatively, the electrodes 38, 40 may be retained within the first groove 32 and the second groove 34, respectively, via an adhesive and/or may be retained therein via a snap-fit engagement.

Regardless of how the first electrode 38 and second electrode 40 are retained within the first groove 32 and second groove 34, the first electrode 38 and second electrode 40 may be substantially flush with an outer surface 44 of the coating 18 to provide the coating 18 with a substantially constant outer surface 44. Providing the coating 18 with a substantially constant outer surface 44 likewise provides the steering wheel 10 with a substantially constant outer surface, thereby improving the overall feel and aesthetics of the steering wheel 10.

The first electrode 38 and second electrode 40 may include a substantially circular cross-section, as shown in FIG. 4. Alternatively, the first electrode 38 and second electrode 40 may be a so-called "ribbon-type" electrode, whereby the first electrode 38 and second electrode 40 are substantially flat (FIG. 6). While the first electrode 38 and second electrode 40 are described as having either a round cross-section or as being substantially flat, once the first electrode 38 and second electrode 40 are respectively received within the first groove 32 and the second groove 34, the first electrode 38 and the second electrode 40 are substantially flush with the outer surface 44 of the coating 18.

As described, the first electrode 38 and the second electrode 40 are substantially flush with the outer surface 44 of the coating 18 and, further, the polymer paint 36 is substantially uniformly applied to the outer surface 44 of the coating 18. Therefore, when the polymer paint 36 is applied to the coating 18, the thickness of the polymer paint 36 at any location around the coating 18—including at the first electrode 38 and the second electrode 40—includes substantially the same thickness. As a result, the polymer paint 36 includes substantially the same thickness around the entire perimeter of the coating 18, as shown in FIG. 4.

Because the polymer paint 36 is applied to the coating 18 and, thus, at the first electrode 38 and the second electrode 40, the polymer paint 36 is in electrical communication with the first electrode 38 and the second electrode 40. Therefore, applying a voltage to either or both of the first electrode 38 and the second electrode 40 likewise applies a voltage to the polymer paint 36. Applying a voltage to the polymer paint 36 causes a current to flow through the carbon filaments 42 of the polymer paint 36 and around a perimeter of the coating 18. The current flowing through the carbon filaments 42 is resisted by the carbon filaments 42, as the current flows from one electrode 38, 40 to the other electrode 38, 40. The resistance of the current flow by the carbon filaments 42 causes heat to be generated. The heat radiates generally from the polymer paint 36 and causes the wrap 20 to similarly be heated. Supplying the wrap 20 with heat allows a driver to likewise experience a heating effect, thereby increasing the comfort of the driver.

With particular reference to FIG. 2, a control system 46 for use with the heating system 14 is provided. The control system 46 may include a controller 48 having a processor 50 and a memory 52. The controller 48 may be in communication with a power source 54 and may be in communication with at least one temperature sensor 56 associated with the steering wheel 10.

The controller 48 may be attached to the steering wheel 10 or, alternatively, may be remotely located from the steering wheel 10. Further, while the control system 46 is shown as including a stand-alone controller 48, the control system 46 may be integrated into virtually any existing vehicle controller (not shown) to allow the vehicle controller to control operation of the heating system 14. Further, while the controller 48 is shown as being wired to the power source 54 and as being in wireless communication with the temperature sensor 56, the controller could communicate with the power source 54 and/or the temperature sensor 56 via wired or wireless communication.

The controller 48 may store a series of commands within the memory 52 based on user inputs and predetermined settings. The processor 50 may control the power source 54 to control and regulate the amount of voltage supplied to the first electrode 38 and/or second electrode 40. Controlling the amount of voltage supplied to the first electrode 38 and/or the second electrode 40 likewise controls the amount of heat generated by the current flowing through the carbon filaments 42 of the polymer paint 36. As a result, the controller 48 controls the amount of heat supplied to the wrap 20 via the polymer paint 36.

The controller 48 may respond to the temperature sensor 56 to supply voltage to the first electrode 38 and/or second electrode 40 via the power source 54 to maintain a temperature of the steering wheel 10 based on a predetermined setting or a user input. While the control system 46 is shown as including a single temperature sensor 56, additional temperature sensors 56 may be disposed at various locations around the steering wheel 10 to ensure an even distribution of heat. For example, the control system 46 may poll a series of four temperature sensors 56, disposed at discrete locations around a perimeter of the steering wheel 10 to ensure that each location is at a predetermined temperature. Utilizing more than one temperature sensor 56 may allow the control system 46 to increase the voltage supplied to the first electrode 38 and/or the second electrode 40 to increase or decrease the amount of voltage and, thus, the heating effect produced by the carbon filaments 42 if one or more of the temperature sensors 56 reports a temperature above or below a predetermined temperature.

While the heating system 14 may be used with the control system 46 described above to achieve a desired and adjustable heating effect, the heating system 14 could be implemented without use of a control system 46. For example, the number of carbon filaments 42 contained within the polymer paint 36 and applied to the coating 18 may be controlled to provide the heating system 14 and, thus, the steering wheel 10 with a desired heating effect at a constant, predetermined temperature.

Specifically, increasing the number of carbon filaments 42 applied to the coating 18 increases the heating effect produced by the heating system 14 when a predetermined voltage is supplied to the filaments 42 via the first electrode 38 and/or second electrode 40. Likewise, reducing the number of carbon filaments 42 applied to the coating 18 decreases the heating effect produced by the heating system 14 when the predetermined voltage is supplied to the carbon filaments 42 via the first electrode 38 and/or second electrode 40. In sum, the heating system 14 may provide a heating effect to the steering wheel 10 at a predetermined temperature without the aid of electronic controls by controlling the number of carbon filaments 42 applied to the coating 18 via the polymer paint 36.

With particular reference to FIGS. 5 and 6, a steering wheel 10*a* is provided and may include a heating system 14*a*. In view of the substantial similarity in structure and function of the components associated with the steering wheel 10 and heating system 14 with respect to the steering wheel 10*a* and heating system 14*a*, respectively, like reference numerals are used hereinafter and in the drawings to identify like components while like reference numerals containing letter extensions are used to identify those components that have been modified.

The steering wheel 10*a* incorporates the heating system 14*a* and that is supported by a coating 18*a*. The coating 18*a* may include a substantially constant cross-section (FIG. 6), whereby a first electrode 38*a* and a second electrode 40*a* of the heating system 14*a* are disposed on an outer surface 44*a* of the heating system 14*a*.

Given that the first electrode 38*a* and second electrode 40*a* are disposed on an outer surface 44*a* of the coating 18*a*, the first electrode 38*a* and second electrode 40*a* may include a substantially flat profile to minimize the thickness of the steering wheel 10*a*. The first electrode 38*a* and second electrode 40*a* may be attached to the coating 18*a* when the coating 18*a* is molded onto the rim 22. Alternatively or additionally, the first electrode 38*a* and the second electrode 40*a* may be attached to the outer surface 44*a* of the coating 18*a* via an adhesive. While the first electrode 38*a* and second electrode 40*a* are described and shown in FIG. 6 as being substantially flat, the first electrode 38*a* and the second electrode 40*a* could alternatively include a substantially circular cross-section.

Regardless of the particular shape and configuration of the first electrode 38*a* and second electrode 40*a*, the polymer paint 36 may be disposed in areas generally between the first electrode 38*a* and second electrode 40*a* and may partially extend over the first electrode 38*a* and second electrode 40*a* to provide a uniform surface against which the wrap 20 may be positioned. In this configuration, the polymer paint 36 may include a reduced thickness in areas above the first electrode 38*a* and the second electrode 40*a* when compared to areas between the first electrode 38*a* and the second electrode 40*a*.

The first electrode 38*a* and second 40*a* are in electrical communication with the carbon filaments 42 of the polymer paint 36 such that when voltage is provided to the first electrode 38*a* and/or second electrode 40*a*, voltage is likewise provided to the carbon filaments 42 to generate a heating effect. As with the steering wheel 10, the heating effect generated by the carbon filaments 42 of the polymer paint 36 may heat the wrap 20, thereby providing a heating effect to a driver.

With particular reference to FIG. 7, the polymer paint 36 and associated carbon filaments 42 are shown as being located around a perimeter of the steering wheel 10 at discrete locations. Namely, the polymer paint 36 is shown as being positioned proximate to a first position 58 and a second position 60. The first position 58 and second position 60 may be located at any location around a perimeter of the steering wheel 10, 10a and may be located in areas where a driver is likely to engage the steering wheel 10, 10a during use. Electrodes 38, 38a, 40, 40a may likewise only be located at the first position 58 and the second position 60 such that areas 62 are void of electrodes.

The coating 18, 18a may include areas 62 disposed between the discrete locations of the polymer paint 36 that do not include polymer paint 36 and, thus, do not receive a heating effect when voltage is supplied to the carbon filaments 32 of the polymer paint 36. The areas 62 of the coating 18, 18a that do not receive the polymer paint 36 may include a slightly larger diameter than regions of the coating 18, 18a that receive the polymer paint 36 such that when the polymer paint 36 is supplied to the first position 58 and to the second position 60, the diameter of the coating 18, 18a at the first position 58 and at the second position 60 is substantially equal to the diameter of the coating 18, 18a at areas 62. The foregoing construction allows the wrap 20 to be formed around a structure having a substantially constant cross-sectional area.

With particular reference to FIGS. 2-4, operation of the steering wheel 10 will be described in detail. Because operation of the steering wheel 10 is substantially similar to operation of the steering wheel 10a, a detailed description of the operation of the steering wheel 10a is foregone. While a detailed description of the operation of the steering wheel 10a is not provided, the steering wheel 10a may be controlled and may function in a similar manner as the steering wheel 10.

In operation, a driver may energize the heating system 14 by depressing a control switch (not shown) disposed on the steering wheel 10 or, alternatively, located on an instrument panel 64 of the vehicle 12, for example. Once the heating system 14 is energized, the controller 48 may direct the power source 54 to supply voltage to the first electrode 38 and/or to the second electrode 40 to cause current to flow through the carbon filaments 42. Alternatively, if the heating system 14 is not associated with a controller, depression of the control switch would cause voltage to be applied to the first electrode 38 and/or second electrode 40 to cause current to flow through the carbon filaments 42 to produce a heating effect having a predetermined temperature. While the heating system 14 may or may not be associated with a control system having a controller, operation of the heating system 14 will be described hereinafter in conjunction with control system 46 and controller 48.

Regardless of whether the heating system 14 is associated with a controller or not, when current flows through the carbon filaments 42, the resistance of the carbon filaments 42 causes the carbon filaments 42 to emit heat, thereby causing the wrap 20 to likewise be heated. Heating the wrap 20 produces a heating effect that may be experienced by the driver when the driver is engaged with the wrap 20 of the steering wheel 10.

The driver may determine a setpoint temperature by once again depressing a control (not shown) associated with the steering wheel 10 and/or instrument panel 64 to control a temperature of the steering wheel 10. The controller 48 may respond to this setpoint temperature by monitoring one or more temperature sensors 56 associated with the steering wheel 10. The controller 48 may control the power source 52 based on information received from the temperature sensor(s) 56 to ensure that a desired heating effect is provided to the steering wheel 10. Once the controller 48 receives information from one or more temperature sensors 56 that the setpoint temperature is achieved, the controller 48 may prevent the power source 54 from providing voltage to either or both of the first electrode 38 and the second electrode 40 to stop the flow of current through the carbon filaments 42 of the polymer paint 36. Preventing current from flow through the carbon filaments 42 allows the carbon filaments 42 to cool, thereby preventing the carbon filaments 42 from providing a heating effect to the wrap 20.

The controller 48 may store a series of setpoint temperatures in the memory 52 to allow the driver to select between one or more desired setpoint temperatures. Once the driver selects a desired setpoint temperature either by manually inputting a new setpoint temperature or by recalling a desired setpoint temperature from the memory 52, the controller 48 once again controls the power source 54 to direct a predetermined amount of voltage over a predetermined time period that will provide the desired heating effect requested by the driver based on the setpoint temperature.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A steering wheel comprising:
an armature including a rim;
a coating at least partially surrounding said rim;
a pair of electrodes respectively disposed within a pair of grooves formed in said coating, said electrodes being flush with an outer surface of said coating when disposed within said pair of grooves; and
a polymer paint disposed on said coating and including a plurality of carbon filaments that are in electrical communication with said electrodes and are operable to receive voltage from at least one of said pair of electrodes to selectively generate heat.

2. The steering wheel of claim 1, wherein said carbon filaments are carbon nanotubes.

3. The steering wheel of claim 1, wherein the electrodes of said pair of electrodes include a round cross-section.

4. The steering wheel of claim 1, wherein said pair of electrodes are ribbon electrodes having a substantially flat shape.

5. The steering wheel of claim 1, further comprising an outer wrap surrounding said polymer paint.

6. The steering wheel of claim 5, wherein said outer wrap is one of a leather wrap and a synthetic wrap.

7. The steering wheel of claim 1, wherein said polymer paint is applied around an entire perimeter of said coating.

8. The steering wheel of claim 1, wherein said polymer paint is applied at discrete locations around a perimeter of said coating.

9. The steering wheel of claim 1, wherein said pair of electrodes are molded into said coating.

10. A heating system for a steering wheel having a rim, the heating system comprising:
a coating surrounding the rim;

a first electrode attached to the rim via said coating, said first electrode being flush with an outer surface of said coating;

a second electrode attached to the rim via said coating, said second electrode being flush with said outer surface of said coating;

a polymer paint applied to said coating and in electrical communication with said first electrode and said second electrode, said polymer paint including a plurality of carbon filaments operable to receive voltage from at least one of said first electrode and said second electrode to selectively generate heat; and a wrap disposed over said polymer paint and operable to receive said heat from said carbon filaments.

11. The heating system of claim 10, further comprising a controller operable to control said voltage supplied to said carbon filaments.

12. The heating system of claim 10, wherein said carbon filaments are carbon nanotubes.

13. The heating system of claim 10, wherein said first electrode and said second electrode are disposed within respective grooves formed in said coating.

14. The heating system of claim 10, wherein said first electrode and said second electrode include a round cross-section.

15. The heating system of claim 10, wherein said first electrode and said second electrode are ribbon electrodes having a substantially flat shape.

16. The heating system of claim 10, wherein said outer wrap is one of a leather wrap and a synthetic wrap.

17. The heating system of claim 10, wherein said polymer paint is applied around an entire perimeter of said coating.

18. The heating system of claim 10, wherein said polymer paint is applied at discrete locations around a perimeter of said coating.

* * * * *